United States Patent
Sugimoto et al.

(10) Patent No.: US 6,949,226 B2
(45) Date of Patent: Sep. 27, 2005

(54) SODIUM-BASED DECHLORINATING AGENT AND WASTE TREATMENT EQUIPMENT

(75) Inventors: Tomio Sugimoto, Chiba (JP); Masumi Itaya, Chiba (JP); Yoshinao Hirano, Tokyo (JP); Hiroaki Harada, Tokyo (JP); Hachiro Hirano, Tokyo (JP); Sigeru Sakurai, Fukuoka (JP); Makoto Yoshida, Tokyo (JP); Masaharu Tanaka, Chiba (JP)

(73) Assignees: Mitsui Engineering & Shipbuilding, Tokyo (JP); Asahi Glass Company Ltd., Tokyo (JP)

( * ) Notice: Subject to any disclaimer, the term of this patent is extended or adjusted under 35 U.S.C. 154(b) by 682 days.

(21) Appl. No.: 09/888,527

(22) Filed: Jun. 25, 2001

(65) Prior Publication Data

US 2002/0006372 A1 Jan. 17, 2002

Related U.S. Application Data

(62) Division of application No. 09/704,894, filed on Nov. 2, 2000, now Pat. No. 6,482,379.

(51) Int. Cl.[7] .......................... B09B 3/00; C22B 26/10; C01D 7/00
(52) U.S. Cl. .............................. 422/184.1; 423/499.4; 423/499.5; 423/422; 423/267
(58) Field of Search ................................ 422/168, 169; 423/499.4, 240 S; 110/259, 233, 229; 252/189

(56) References Cited

U.S. PATENT DOCUMENTS

| | | | |
|---|---|---|---|
| 4,155,820 A | * 5/1979 | Ogawa et al. | 205/536 |
| 4,878,440 A | * 11/1989 | Tratz et al. | 110/233 |
| 5,478,447 A | 12/1995 | Ninane et al. | 204/98 |
| 5,735,224 A | * 4/1998 | Takasuka et al. | 110/259 |
| 6,254,846 B1 | * 7/2001 | Depelsenaire | 423/499.4 |
| 6,352,653 B1 | * 3/2002 | Hirano et al. | 252/189 |

FOREIGN PATENT DOCUMENTS

| | | | |
|---|---|---|---|
| EP | 0 740 577 B1 | 11/1997 | B01D/53/68 |
| EP | 1 004 345 A2 | 11/1999 | B01D/53/68 |
| EP | 1 040 892 A1 | 3/2000 | B24C/11/00 |

* cited by examiner

Primary Examiner—Glenn Caldarola
Assistant Examiner—Tom P. Duong
(74) Attorney, Agent, or Firm—Heslin Rothenberg Farley & Mesiti P.C.

(57) ABSTRACT

A sodium-based dechlorinating agent is added to a flue gas; hydrogen chloride contained in this flue gas is removed as residue of dechlorination; the thus removed residue of dechlorination is dissolved by adding water; water-insoluble constituents are separated from the resulting aqueous solution; and after adjusting pH of the aqueous solution remaining after separation of the water-insoluble constituents, mercury, dioxin, and the like are removed and discharged. The sodium-based dechlorinating agent is mixed with a hydrophilic anti-caking agent, with an angle of repose of 40° or more, a dispersibility of less than 50, and a floodability index value of less than 90. This permits inhibition of occurrence of a pressure drop and leakage in the filter cloth of the dust collector.

9 Claims, 6 Drawing Sheets

SODIUM-BASED DECHLORINATING AGENT AND WASTE TREATMENT EQUIPMENT

This application is a division of U.S. application Ser. No. 09/704,894 filed on Nov. 2, 2000, now U.S. Pat. No. 6,482,379.

BACKGROUND OF THE INVENTION

1. Field of the Invention

The present invention relates to a method for removing hydrogen chloride from a flue gas.

2. Description of the Related Art

A device for treating of a flue gas containing hydrogen chloride is installed, for example, in a waste treatment equipment of subjecting waste to a incineration treatment. In this waste treatment equipment, a first dust collector and a second dust collector are arranged in series, and after removal of dust such as combustion fly ash contained in flue gas by the first dust collector, a dechlorination of flue gas is carried out in the second dust collector.

To carry out dechlorinating in the second dust collector, a dechlorinating agent is added into flue gas before the second dust collector. As a dechlorinating agent, a calcium-based dechlorinating agent such as calcium hydroxide ($Ca(OH)_2$) has conventionally been mainly employed. Calcium hydroxide, if added into flue gas, reacts with hydrogen chloride (HCl) contained in the flue gas to generate residue of dechlorination containing calcium chloride ($CaCl_2$), calcium oxide (CaO) and the like. However, thus generated residue of dechlorination is useful only in that calcium chloride is applied as a snow melting agent or a moisture absorbent, with a narrow range of effective uses. Residue of dechlorination is mostly solidified through a chemical treatment or with cement and disposed of in reclamation. However, acquisition of reclamation site is now becoming more difficult.

It is therefore proposed to use a sodium-based dechlorinating agent such as sodium hydrogencarbonate (sodium bicarbonate: $NaHCO_3$) or sodium carbonate (soda ash: $Na_2CO_3$) in place of the calcium-based dechlorinating agent. In this case, when a sodium-based dechlorinating agent is added into a flue gas, hydrogen chloride contained in the flue gas becomes sodium chloride (NaCl). Adding water to residue of dechlorination dissolves sodium chloride. Therefore, water-soluble constituents dissolved in water are diluted and discharged, and only water-insoluble constituents not dissolved in water are separated and can be subjected to a combustion treatment in a melting furnace, thus eliminating the necessity of disposal in reclamation.

When sodium hydrogencarbonate is adopted as a sodium-based dechlorinating agent and sodium hydrogencarbonate has a particle size larger than 30 μm, powder particles never coagulating together between them, and the agent is stable as powder. However, sodium hydrogencarbonate having a particle size larger than 30 μm leads to a very low removing ratio of hydrogen chloride, so that the use thereof as a dechlorinating agent is not appropriate. In general, therefore, sodium hydrogencarbonate ground to a particle size of 30 μm or less is used as a sodium-based dechlorinating agent.

However, when sodium hydrogencarbonate is ground to a particle size of 30 μm or less, coagulation of powder particles results in a form of fibrous dust balls or stone-like lumps. Ground sodium hydrogencarbonate has thus an unstable condition as powder, thus making is impossible to stably supply the same to flue gas.

To solve this defect, it is the usual practice to use an anti-caking agent. In the conventional art, a hydrophobic anti-caking agent has been used as such an anti-caking agent. A hydrophobic anti-caking agent brings about a remarkable solidification inhibiting effect. Sodium hydrogencarbonate added with a hydrophobic anti-caking agent has high flowability and floodability property, and exhibits satisfactory stability as a powder.

However, when a hydrophobic anti-caking agent added with sodium hydrogencarbonate is added into a flue gas as a dechlorinating agent, particles resulting from reaction with hydrogen chloride after calcination of sodium hydrogencarbonate, viz residue of neutralization, and particles of the anti-caking agent, which both have a high flowability, tend to easily entrap inside a filter cloth attached in a second dust collector comprising, for example, a bag filter. When particles of residue of neutralization or particles of the anti-caking agent penetrate into the filter cloth, there is caused clogging, resulting in an excessive pressure drop at the filter cloth and making it impossible to continue operation. It is difficult to recover from clogging even by back washing of the bag filter by the use of pulse air.

Further, some of particles produced from reaction with hydrogen chloride after calcination of sodium hydrogencarbonate, viz residue of neutralization, having entrapped into the filter cloth and particles of the anti-caking agent pass through the filter cloth, causing leakage of the dechlorinating agent and residue of neutralization. A double-woven glass cloth is usually used as a filter cloth. In order to prevent leakage of the dechlorinating agent and residue of neutralization, it is necessary to use a special filter cloth made by applying a Teflon membrane coated to the surface of the double-woven glass cloth. If the membrane is damaged or peeled off during use, however, a new problem of leakage of chemicals from this portion is encountered.

An object of the present invention is to prevent occurrence of an excessive pressure drop or leakage in the filter cloth attached to the dust collector.

SUMMARY OF THE INVENTION

For the purpose of solving the aforementioned problems, improvement is made for the sodium-based dechlorinating agent in the present invention. More particularly, the sodium-based dechlorinating agent of the invention comprises a mixture of sodium hydrogencarbonate and a hydrophilic anti-caking agent, and has an angle of repose of 40° or more, a dispersibility of less than 50, and a floodability index of less than 90.

According to the sodium-based dechlorinating agent having the above-mentioned configuration, in which the hydrophilic anti-caking agent has a slight cohesion, flowability of sodium hydrogencarbonate particles and the anti-caking agent becomes sluggish: sodium hydrogencarbonate particles or anti-caking agent particles never come in the filter cloth, and form a stable filtration layer on the surface of the filter cloth. It is consequently possible to prevent occurrence of an excess pressure drop in the filter cloth, and occurrence of leakage from the filter cloth.

Physical properties were measured using a powder tester Model PT-D made by Hosokawa Micron Corporation.

The measurement of the angle of repose is carried out, by causing a powdery sample to pass through a screen having a diameter of 80 mm and a mesh opening of 710 μm while vibrating the screen, and gently dropping the sieved sample from a funnel having a height of 160 mm onto a horizontal table having a diameter of 80 mm, as an angle formed between a generating line of a cone formed by the powder and the horizontal plane, and takes a smaller value according as flowability is higher. The falling amount of powder is measured until the angle of repose becomes substantially stabilized.

The floodability index value is a criterion for numerically evaluating the flood property. The floodability index value is defined, by determining indices from Tables 5 and 6 from measured values of flowability index value, angle of fall, angle of difference and dispersibility, as a value available by summing up these indices: a larger value corresponds to a higher floodability property. The definitions of the individual physical properties will now be described. The flowability index value is determined by similarly determining indices from measured values of angle of repose, compressibility, angle of spatula and uniformity coefficient, and expressed in a value obtained by summing up these values of indices. The angle of repose is determined by the above-mentioned method.

The compressibility is defined as:

{(Packed bulk density)−(Aerated bulk density)}/(Packed bulk density)×100

The aerated bulk density is determined, by causing a powdery sample to pass through a screen having a diameter of 80 mm and a mesh opening of 710 µm while vibrating the same, and filling a container having an inner volume of 100 cm$^3$ just with the powder under screen, as a measured mass of the powder. The packed bulk density is determined by causing a container containing powder to tap at a pace of 180 taps for a period of 180 seconds, and measuring the mass corresponding to a volume of 100 cm$^3$. The angle of spatula is determined by keeping horizontally a spatula made of a metal having a size 120×22 mm, and measuring the inclination angle of the side surface of the powder accumulated thereon.

The uniformity is defined, in the cumulative mass distribution obtained from a particle size distribution measured by sieve analysis, as a value obtained by dividing the particle diameter at 60% of cumulative undersize distribution by the particle diameter at 10% cumulative undersize distribution. The particle size distribution is determined by any of various methods such as the sieve analysis and the laser diffraction scattering method, in response to the particle size of the powder to be measured and the like. Values measured by the laser diffraction scattering method are adopted in the invention, using a "Microtrack FRA9220" made by Nikkiso Co., Ltd. for measurement.

The angle of fall is determined by applying a constant impact force three times with a shocker annexed to the measuring instrument to the cone of powder formed for the purpose of measuring the angle of repose, and measuring the inclination angle of a cone formed as a result of fall.

The angle of difference is determined as a value obtained by subtracting the value of angle of fall from the value of angle of repose.

The dispersibility is determined by dropping 10 g powder sample from a height of 61 cm at a stroke onto a watch glass having a diameter of 10 cm installed with the concave side down, as a percentage of the mass of the powder sample scattering outside the watch glass relative to the total mass of the dropped powder sample. A powder sample higher in this value has generally high scattering property and floodability.

Sodium hydrogencarbonate should preferably have a mean particle diameter within a range of from 2 µm to 30 µm. With the mean particle diameter larger than 30 µm, reaction between the sodium-based dechlorinating agent and hydrogen chloride may become insufficient. With the mean particle diameter smaller than 2 µm, on the other hand, much time and labor may be required for grinding. In order to achieve a sufficient reaction of the sodium-based dechlorinating agent, a mean particle diameter suffices to be within a range of from 2 µm to 30 µm, a mean particle diameter within a range of from 2 µm to 10 µm gives a higher reaction, and is therefore more recommendable.

Applicable anti-caking agents generally include silica, magnesium stearate, calcium stearate and magnesium carbonate.

The hydrophilic anti-caking agent in the invention should preferably comprise silica and should preferably be mixed in the total mass of the dechlorinating agent in an amount of 0.1% or more. An amount less than 0.1% is insufficient to obtain an anti-caking effect. Since the hydrophilic anti-caking agent is insoluble in water, a high blending ratio of agent would require much time and labor for treating residue of dechlorination. The hydrophilic anti-caking agent should more preferably be mixed therefore in the total mass of the dechlorinating agent in an amount within a range of from 0.1% to 5%.

Further, a mean particle diameter of the hydrophilic anti-caking agent should preferably be within a range of from 0.001 µm to 1 µm. While a smaller particle diameter leads to a more remarkable anti-caking effect, it is not technically easy to achieve a powder of a particle diameter smaller than 0.001 µm industrially at a low cost. A mean particle diameter larger than 1 µm results in a smaller effect of anti-caking. It should therefore be more preferably within a range of from 0.001 µm to 0.1 µm.

The waste treatment equipment of the present invention comprises a pyrolytic reactor which causes pyrolysis of waste to generate pyrolytic gases and pyrolytic residue mainly comprising non-volatile constituents; separating means for separating the pyrolytic residue into combustible constituents and incombustible constituents; a combustion melting furnace to which the pyrolytic gases and the combustible constituents are fed, and which causes combustion thereof and discharges molten slag and flue gases; first flue gas treating means for removing dust from the flue gases; second flue gas treating means dechlorinating the flue gases from the first flue gas treating means by adding a dechlorinating agent; a separator which separates water-insoluble constituents not dissolved in water from an aqueous solution containing the residue of dechlorination dissolved therein by adding water to the residue of dechlorination generated by the second flue gas treating means; a pH modifier which adjusts pH of the remaining aqueous solution after separation by the water-insoluble constituents by the separator; and at least another one dioxin removing unit which removes dioxin and the like from the residue of dechlorination generated by the second flue gas treating means and/or from the aqueous solution of which pH has been adjusted by the pH modifier; wherein a sodium-based dechlorinating agent is added to the second flue gas treating means.

As described above, a dioxin removing unit for removing dioxin and the like from the aqueous solution of which pH has been adjusted by the pH modifier may be installed as a dioxin removing unit. In place of this dioxin removing unit for removing dioxin from the aqueous solution of which pH has been adjusted, a dioxin removing unit for removing dioxin and the like from residue of dechlorination generated by the second flue gas treating means may be provided. When the dioxin removing unit for removing dioxin and the like from residue of dechlorination generated by the second flue gas treating means is provided, this dioxin removing unit can remove dioxin and the like almost totally, but in order to remove dioxin and the like not removed, a second dioxin removing unit may be provided in the downstream of the pH modifier.

It is possible to remove mercury from the aqueous solution remaining after separation of water-insoluble constituents by the use of a chelating resin or a chelating agent (hereinafter collectively referred to as "chelating substance").

Further, a mixer for mixing sodium hydrogencarbonate and the hydrophilic anti-caking agent, and a grinder for grinding sodium hydrogencarbonate may be provided in the upstream of the second flue gas treating means in the aforementioned waste treatment equipment. A mercury removing unit for removing mercury from the aqueous solution of which pH has been adjusted by the pH modifier may be added in the downstream of the pH modifier in the aforementioned waste treatment equipment.

The flue gas dechlorinating method of the invention comprises the step of adding the above-mentioned sodium-based dechlorinating agent into the flue gases to cause hydrogen chloride contained in the flue gases to react with the sodium-based dechlorinating agent to remove the same.

Further, the flue gas dechlorinating method of the invention comprises the steps of causing hydrogen chloride contained in the flue gas to react with the sodium-based dechlorinating agent to remove the same as residue of dechlorination, removing dioxin and the like from the residue of dechlorination, then, dissolving the residue of dechlorination by adding water, separating water-insoluble constituents not dissolved in water from an aqueous solution in which the residue of dechlorination is dissolved, and adjusting pH of the remaining aqueous solution after separation of the water-insoluble constituents.

In the above-mentioned flue gas dechlorinating method, dioxin and the like not fully removed may be removed again after pH adjustment.

DESCRIPTION OF THE PREFERRED EMBODIMENTS

Embodiments of the present invention will now be described with reference to the drawings.

Figure 1:
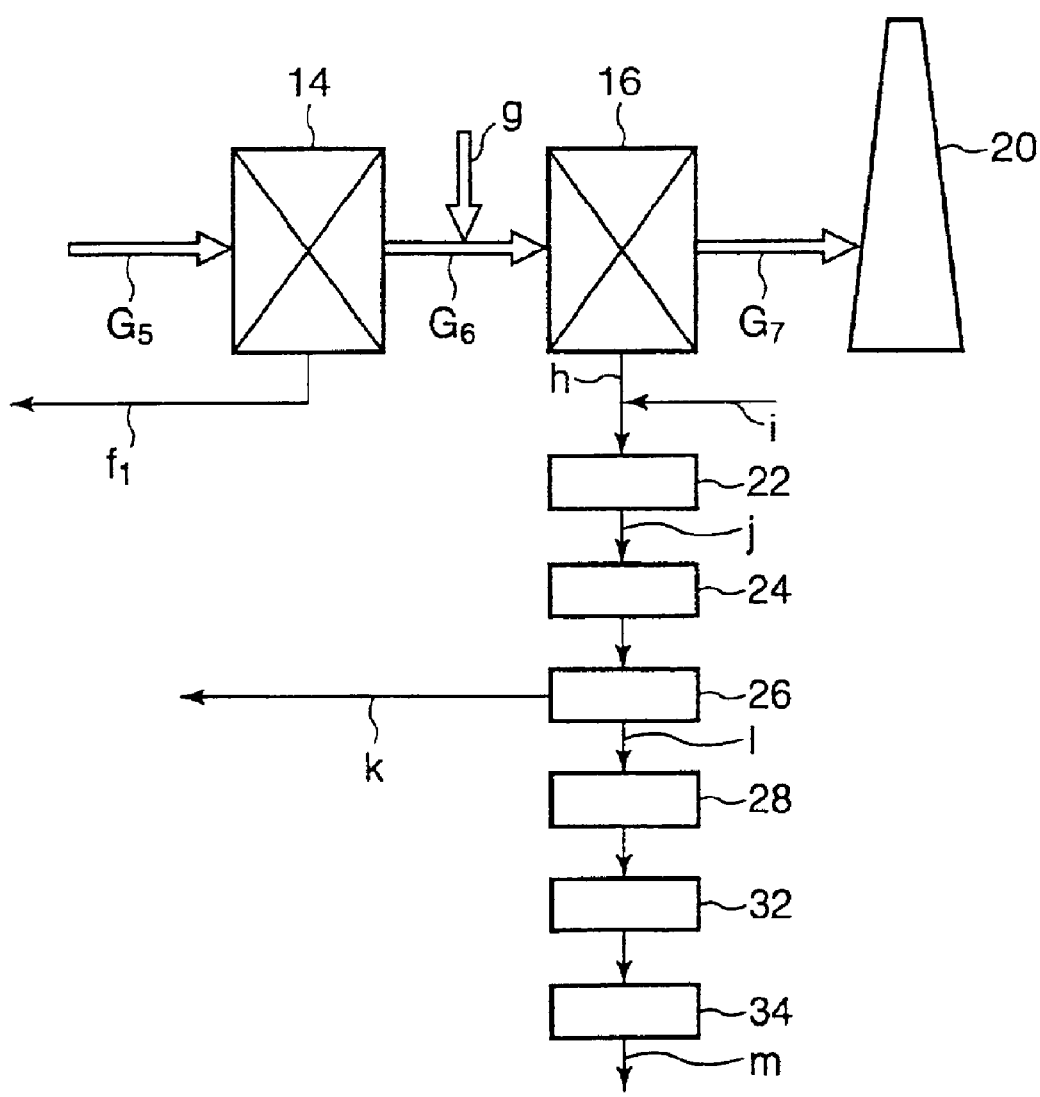
FIG. 1 is a system diagram illustrating an embodiment of the apparatus capable of carrying out dechlorinating by means of a sodium-based dechlorinating agent of the present invention.

FIG. 1 is a system diagram of an apparatus capable of carrying out dechlorinating by means of a sodium-based dechlorinating agent by the application of the invention. This embodiment represents an application of the invention to the dechlorinating of a flue gas, such as a flue gas G5 produced upon treating flue. As shown in FIG. 1, the flue gas dechlorinating apparatus comprises a first dust collector 14 serving as first flue gas treating means and a second dust collector 16 serving as second flue gas treating means for two-stage dust collection.

The flue gas G5 produced upon treating waste is sent to the first dust collector 14. The first dust collector 14 removes dust (incineration fly ash) f1 from the flue gas G5. The flue gas G6 from which dust f1 has been removed is sent to the second dust collector 16. At this point, the sodium-based dechlorinating agent g of the invention is added into the flow channel in the upstream of the second dust collector 16. Because dust f1 has previously been removed in the first dust collector 14, residue of dechlorination h removed in the second dust collector 16 contains almost no dust f1. As a result, the residue of dechlorination h can easily been disposed of as compared with the case with a single dust collector.

The sodium-based dechlorinating agent g comprises a mixture of sodium hydrogencarbonate (sodium bicarbonate: $NaHCO_3$) and a hydrophilic anti-caking agent. Sodium hydrogencarbonate should be ground to a mean particle diameter within a range of from 2 $\mu$m to 30 $\mu$m, or preferably, from 2 $\mu$m to 10 $\mu$m, and mixed with a silica-based hydrophilic anti-caking agent in an amount of 0.1 mass % or more, or preferably within a range of from 0.1 mass % to 5 mass %. A mean particle diameter of the hydrophilic anti-caking agent should be within a range of from 0.001 $\mu$m to 1 $\mu$m, or preferably, from 0.001 $\mu$m to 0.1 $\mu$m. Applicable hydrophilic anti-caking agents include, for example, hydrophilic fumed silica made by Tokuyama Corporation. When sodium hydrogencarbonate particles are ground to a particle diameter within a range of from 2 $\mu$m to 30 $\mu$m, the reaction reaches from the particle surface to the inside, and the fine particle diameter ensure a good adhesion to the filter cloth and a satisfactory utilization efficiency. When the flue gas contains sulfur oxides, the sodium-based dechlorinating agent g serves as a desulfurizer, thus making it possible to accomplish desulfurization in the second dust collector 16, simultaneously with dechlorinating.

Upon adding the sodium-based dechlorinating agent g, sodium chloride (NaCl) produced from reaction with hydrogen chloride (HCl) contained in the flue gas is discharged as residue of dechlorination from the second dust collector 16. The dechlorinated flue gas G7 is discharged from a stack 20 as a cleaned gas.

The residue of dechlorination h removed in the second dust collector 16 is, on the other hand, added with water i and dissolved in a dissolving tank 22, further sent to a relay tank 24, and stored as an aqueous solution j. When water i is added, water-soluble constituents in the residue of dechlorination h are dissolved in water, but water-insoluble constituents k are not dissolved in water, and remain as suspended substance in the aqueous solution.

Then, the produced aqueous solution j is sent to a separator 26 for separation such as filtration, and the water-insoluble constituents k forming the suspension are separated from the aqueous solution. The separated water-insoluble constituents k are returned to a pyrolytic reactor not shown, as described later, and finally discharged to outside the system through conversion into molten slag in a combustion melting furnace. At this point, dioxin and the like contained in the water-insoluble constituents k are completely removed by decomposition in the combustion melting furnace.

The aqueous solution 1 remaining after separation of the water-insoluble constituents k contains water-soluble constituents, and sent to the next process, the pH adjusting tank 28 for pH adjustment. A pH adjusting agent, an acidic substance such as hydrochloric acid (HCl) is added to neutralize the unreacted dechlorinating agent dissolved in water. Further, dioxin and the like sent to the dioxin removing unit 32 are removed. For removing dioxin and the like, the activated charcoal adsorption method of removing dioxin and the like by causing the aqueous solution to pass through an activated charcoal packed bed or the like is applied. The aqueous solution 1 obtained by removing dioxin from the above-mentioned remaining aqueous solution 1 is stored in a waste water tank 34 as treated water m. From among the above-mentioned water-soluble constituents, only the aqueous solution containing dissolved sodium salts such as sodium chloride is discharged to the sea, rivers and sewerage disposal plant after pH adjustment. In view of the slight content of dioxin, removing dioxin and the like from the aqueous solution 1 after separation of the water-insoluble constituents is simpler in equipment and lower in cost than pyrolytic.

Figure 2:
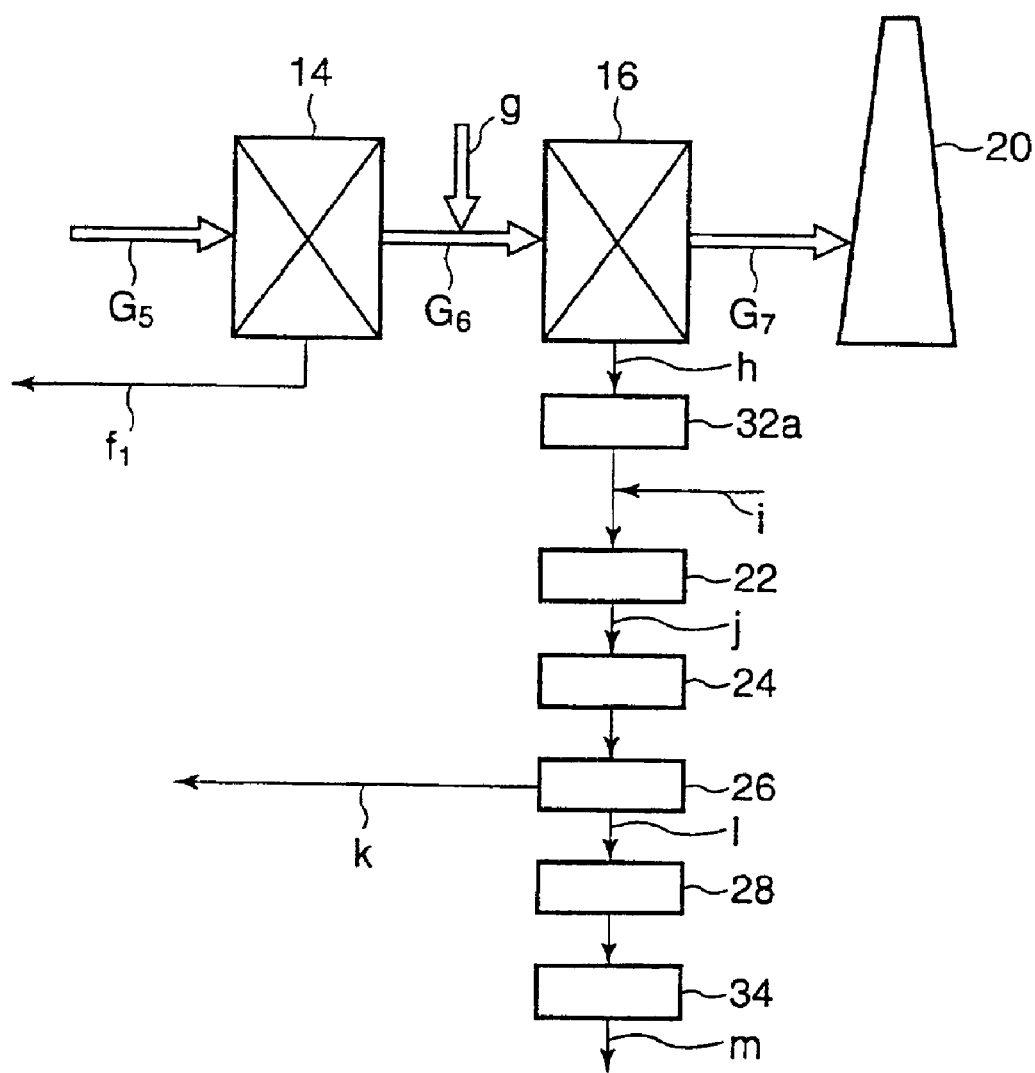
FIG. 2 is a system diagram illustrating another embodiment of the apparatus capable of carrying out dechlorinating by means of a sodium-based dechlorinating agent of the invention.

While, in FIG. 1, in order to remove dioxin and the like contained in the aqueous solution 1 remaining from the separator 26, the dioxin removing unit 32 is provided in the downstream of the pH adjusting tank 28, it is also possible to previously remove dioxin and the like contained in the residue of dechlorination h. More specifically, as shown in FIG. 2, the dioxin removing unit 32a is arranged between the second dust collector 16 and the dissolving tank 22 so that dioxin and the like contained in the residue of dechlorination h are removed before the residue of dechlorination h from the second dust collector 16 are dissolved in water. Applicable dioxin removing unit 32a include, for example, a heating dechlorination unit.

With the configuration as described above, dioxin and the like are almost fully removed from the residue of dechlorination discharged from the dioxin removing unit 32a. Almost no dioxin or the like is therefore contained, not only in the water-insoluble constituents k, but also in the remaining aqueous solution 1.

Figure 3:
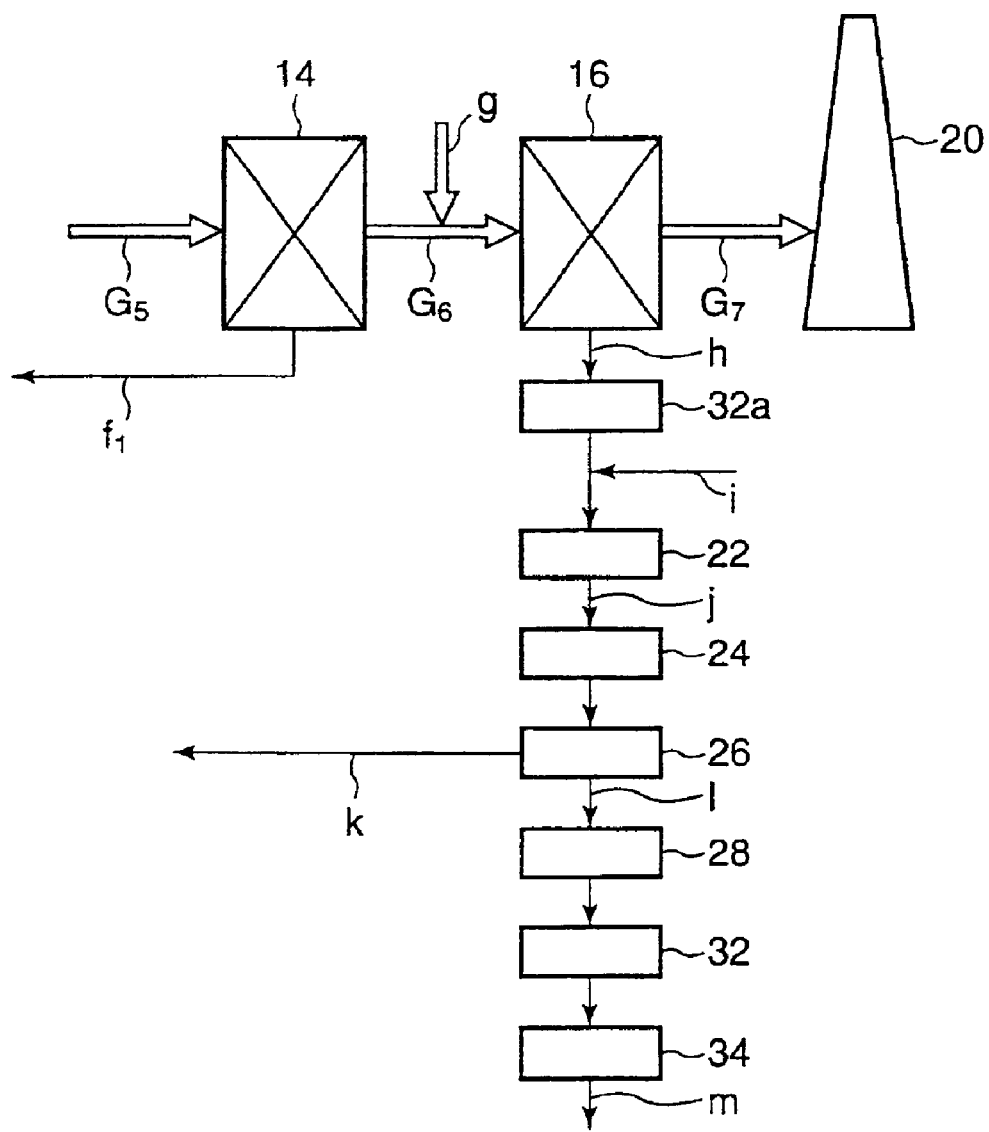
FIG. 3 is a system diagram illustrating still another embodiment of the apparatus capable of carrying out dechlorinating by means of a sodium-based dechlorinating agent of the invention.

Further, the configuration as shown in FIG. 3 may be adopted, in which the dioxin removing unit 32 is arranged in the downstream of the pH adjusting tank 28, and the dioxin removing unit 32a is arranged between the second dust collector 16 and the dissolving tank 22. That is, dioxin and the like can be almost fully removed by the dioxin removing unit 32a. If there occurs a problem of dioxin and the like remaining after removal, the dioxin removing unit 32 completely removes dioxin and the like after pH adjustment.

Figure 4:
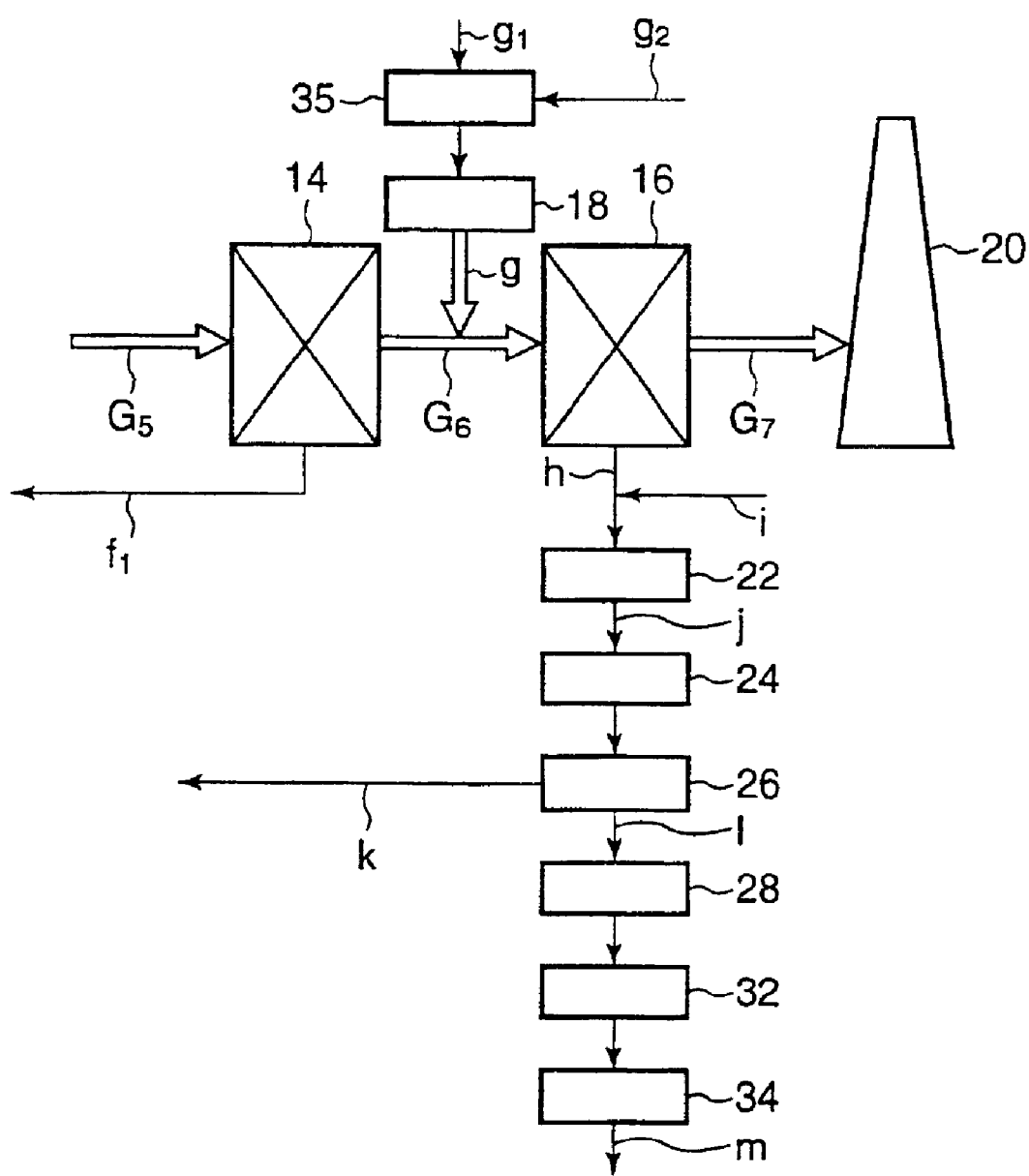
FIG. 4 is a system diagram illustrating further another embodiment of the apparatus capable of carrying out dechlorinating by means of a sodium-based dechlorinating agent of the invention.

The configuration as shown in FIG. 4 may also be adopted, in which a mixer 35 and a grinder 18 are provided as means to grind sodium hydrogencarbonate and mix the hydrophilic anti-caking agent. In general, because sodium hydrogencarbonate g1 has a mean particle diameter within a range of from 50 $\mu$m to 270 $\mu$m, the process comprises the steps of adding hydrophilic silica having a mean particle diameter within a range of from 0.001 $\mu$m to 1 $\mu$m as the hydrophilic anti-caking agent g2 in an amount of 0.1 mass % to sodium hydrogencarbonate g1, mixing sodium hydrogencarbonate g1 and the hydrophilic anti-caking agent g2 in the mixer 35, grinding the resulting mixture to a mean particle diameter within a range of from 2 $\mu$m to 30 $\mu$m in the grinder 18, thus generating the sodium-based dechlorinating agent g. This sodium-based dechlorinating agent g is added to the flue gas G6 from which dust f1 has been removed by the first dust collector 14. The sodium hydrogencarbonate ground to a mean particle diameter within a range of from 2 $\mu$m to 30 $\mu$m, because its particle size is fine, reacts from the particle surface to inside, and has a good adhesion property to the filter cloth of the bag filter. Therefore it ensure a satisfactory utilization efficiency.

In the configuration shown in FIG. 4, in which the dioxin removing unit 32 is arranged in the downstream of the pH adjusting tank 28, the dioxin removing unit 32a may be arranged between the second dust collector 16 and the dissolving tank 22, as in the configuration shown in FIG. 2. Further, as in the configuration shown in FIG. 3, the dioxin removing unit 32 may be arranged in the downstream of the pH adjusting tank 28, and the dioxin removing unit 32 may be arranged between the second dust collector 16 and the dissolving tank 22.

Figure 5:
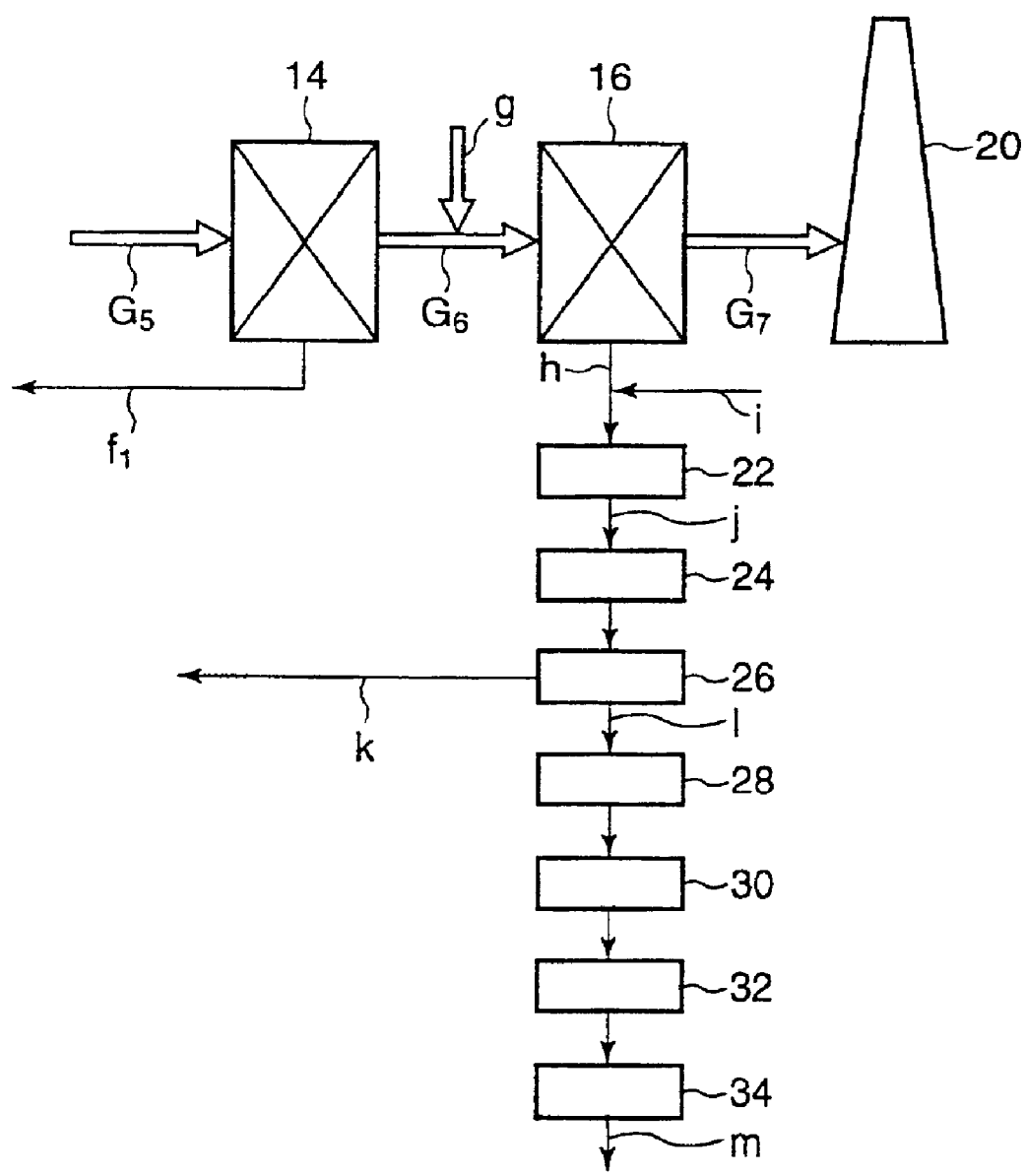
FIG. 5 is a system diagram illustrating another embodiment of the apparatus capable of carrying out dechlorinating by means of a sodium-based dechlorinating agent of the invention.

It is also possible, as shown in FIG. 5, to arrange a mercury removing unit 30 between the pH adjusting tank 28 and the dioxin removing unit 32 for the purpose of removing mercury contained in the remaining aqueous solution 1 from the separator 26.

With such a configuration, mercury, a heavy metal, is removed by the mercury removing unit 30 after pH of the aqueous solution 1 remaining after separation of the water-insoluble constituents k in the separator 26 is adjusted in the pH adjusting tank 28. Mercury may be removed, for example, by the precipitation method, the ion exchange method, or the adsorbing method. In the application of the precipitation method, available techniques include one causing precipitation in the form of mercury sulfide or one using a heavy metal scavenger having a dithiocarbamate group and the like. In the ion exchange method, when mercury is present as an anion such as halide complex ion, an anion exchange resin is used. In the adsorbing method, a chelating resin having a high selectivity of specific heavy metal ions by chelate effect, an activated charcoal or an activated coke is employed. Applicable chelating resins include, for example, polyacryl, polystyrene or phenol resin as substrate, and thiol type, dithiocarbamate type, isothuronium type, dithizone type, thiourea type, imidodiacetate type or polyamine type as a coordination radical. Applicable kinds of activated charcoal include, for example, gas-activated charcoal, zinc chloride-activated charcoal, granulated activated charcoal, coconut shell activated charcoal, and granular activated carbon black. From among these methods, the method using a chelating material such as a chelating agent or a chelating resin is preferable because of the simplicity and accuracy.

The aqueous solution from which mercury has been removed is fed to the dioxin removing unit 32 for removal of dioxin and the like. The applicable dioxin removing methods are the same as those described above in the case shown in FIG. 1.

In FIG. 5, the dioxin removing unit 32 is arranged in the downstream of the pH adjusting tank 28 (in the downstream of the mercury removing unit 30). As shown in FIG. 2, however, the dioxin removing unit 32a may be arranged between the second dust collector 16 and the dissolving tank 22. Further, as shown in FIG. 3, the dioxin removing unit 32 in the downstream of the pH adjusting tank 28, and the dioxin removing unit 32a may be arranged between the second dust collector 16 and the dissolving tank 22.

Figure 6:
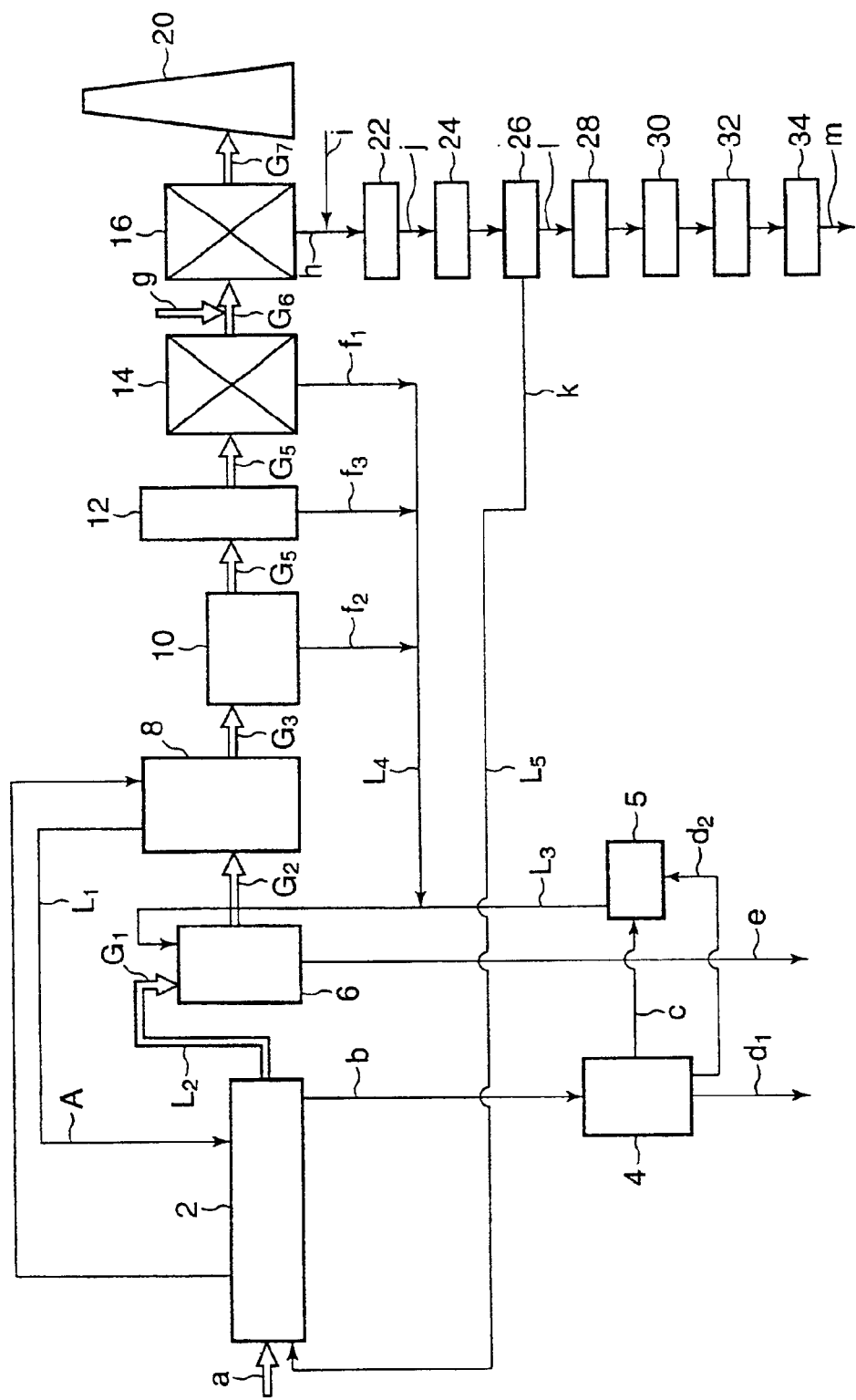
FIG. 6 is a system diagram illustrating a waste treatment equipment as further another embodiment of the invention.

The waste treatment equipment for treating of waste and produced flue gas will now be described with reference to FIG. 6. FIG. 6 is a system diagram illustrating an embodiment of the waste treatment equipment of the invention.

In this waste treatment equipment, waste a ground to under 150 μmm square such as municipal waste is fed by feeding means such as a screw feeder to a pyrolytic reactor 2, as shown in FIG. 6. For example, a horizontal type rotary drum is used as this pyrolytic reactor 2. The inside of the reactor 2 is kept with a low-oxygen atmosphere by a sealing mechanism not shown, and simultaneously, heated air A heated by a heat exchanger 8 arranged in the downstream of the combustion melting furnace 6 in the downstream is fed from a line L1.

The waste a fed to the pyrolytic reactor 2 is heated by the heated air A to a temperature within a range of from 300 to 600° C., or usually, of about 450° C. This causes pyrolysis of the waste a, generating a pyrolytic gas G1 and pyrolytic residue b which is mainly non-volatile. The pyrolytic gas G1 and the pyrolytic residue b generated in the pyrolytic reactor 2 are separated by a discharge unit not shown, and the pyrolytic gas G1 is fed via a line L2 which is a pyrolytic gas piping to a burner of the combustion melting furnace 6.

The pyrolytic residue b, varying with the kind of the waste a, is found to comprise as follows in mass % according to findings obtained by the present inventors:

Combustible mostly comprising relatively

| | |
|---|---|
| fine particles: | 10 to 60%, |
| Relatively fine ash: | 5 to 40%, |
| Coarse metal particles: | 7 to 50%, |
| Coarse debris, ceramics, concrete, etc.: | 10 to 60%. |

The pyrolytic residue b, which is discharged at a relatively high temperature of about 450° C., is cooled to about 80° C. by a cooling unit not shown in figures, and led to a separator 4 serving as separating means, where the residue is divided into pyrolytic carbon c which is a combustible constituent, valuables d1, and debris d2 which are incombustible constituents. A vibrating screen, a magnetic separator, and a separator for aluminum and the like known separator is used as the separator 4.

The pyrolytic carbon c and debris d2, separated from the incombustible constituent which are then discharged, are ground by a grinder 5 of the roll type, the tube mill type, the rod mill type or the ball mill type, and fed to the combustion melting furnace 6. A grinder 5 is appropriately selected in accordance with the kind and properties of the waste. In the grinder, the pyrolytic carbon c and debris d2 should preferably be ground to a particle diameter of 1 mm or less and fed via a line L3 to a burner of the combustion melting furnace 6.

On the other hand, combustion air fed by a fan not shown, the pyrolytic gas G1 and pyrolytic carbon c are burnt in the combustion melting furnace at a temperature within a high-temperature region of about 1,300° C. Through this combustion, combustion ash generated from relatively fine ash particles of pyrolytic carbon c and debris d2 is melted and generates molten slag e. Molten slag e is converted into water granulated slag by dropping from the slag taphole of the combustion melting furnace 6 into a water tank not shown. Water granulated slag is blocked into a prescribed shape by an apparatus not shown or formed into particles for reuse as a building material or a paving material.

The combustion flue gas G2 generated in the combustion melting furnace 6 of the waste treatment equipment is subjected to heat recovery in the heat exchanger 8 to become flue gas G3, which is fed to a waste heat boiler 10 where heat is recovered and the flue gas G3 is thus converted into flue gas G4. The flue gas G4 is sent to a temperature reducing tower 12 to reduce the temperature. The flue gas G5 of which the temperature has been reduced in the temperature reducing tower 12 is sent to the first dust collector 14. In the waste heat boiler 10, the temperature reducing tower 12 and the first dust collector 14, dust f2, f3 and f1 are collected, respectively. The gas is then returned to the burner of the combustion melting furnace 6 via the lines L4 and L3, together with pyrolytic carbon c separated at the separator 4, and subjected to combustion and melting in the combustion melting furnace 6 to become slag.

The water-insoluble constituents k separated in the separator 26 are also returned via the line L5 to the pyrolytic reactor 2, and finally burnt and melted in the combustion melting furnace 6 to become slag. In this process, heavy metals are made harmless through slag formation. The subsequent treatments of the flue gas G5 sent to the first dust collector 14 are the same as those shown in FIG. 5. The description thereof is therefore omitted here. The subsequent treatments of the flue gas G5 sent to the first dust collector 14 may be accomplished through a treatment system of the configuration shown in FIGS. 1, 2 or 3.

EXAMPLES

Experiments were carried out on practical applicability of the sodium-based dechlorinating agent of the present invention. A hydrophilic anti-caking agent is mixed in the sodium-based dechlorinating agent of the invention (hereinafter referred to as "sodium-based dechlorinating agent A"). For comparison purposes, a sodium-based dechlorinating agent mixed with a hydrophobic anti-caking agent in place of the hydrophilic anti-caking agent (hereinafter referred to as "sodium-based dechlorinating agent B") was prepared, and experiments were also carried out on practical applicability thereof.

The sodium-based dechlorinating agent A comprises sodium hydrogencarbonate having a mean particle diameter of 8 μm mixed with hydrophilic fumed silica having a mean particle diameter of 0.013 μm serving as an anti-caking agent in an amount of 1 mass %. The sodium-based dechlorinating agent B comprises sodium hydrogencarbonate having a mean particle diameter of 8 μm mixed with hydrophobic fumed silica having a mean particle diameter of 0.013 μm serving as an anti-caking agent in an amount of 1 mass %. Various data for the anti-caking agents added to the sodium-based dechlorinating agents A and B are shown in Table 1. In Table 1, the anti-caking agent A represents the anti-caking agent added to the sodium-based dechlorinating agent A, and the anti-caking agent B, the anti-caking agent added to the sodium-based dechlorinating agent B, respectively.

TABLE 1

| | ANTI-CAKING AGENT A | ANTI-CAKING AGENT B |
|---|---|---|
| KIND | HYDROPHILIC | HYDROPHOBIC |
| NAME | FUMED SILICA | FUMED SILICA |
| MAKER | TOKUYAMA CORP. | TOKUYAMA CORP. |
| PRODUCT NAME | REOLOSIL QS-102 | REOLOSIL MT-10 |
| QUANTITY OF ADDITION | 1 mass % | 1 mass % |

TABLE 1-continued

|  | ANTI-CAKING AGENT A | ANTI-CAKING AGENT B |
|---|---|---|
| PARTICLE SIZE | 0.014 μm | 0.013 μm |
| CHEMICAL COMPOSITION | SILICA ($SiO_2$) | SILICA ($SiO_2$) |

The angle of repose, the flowability index and the dispersibility were determined for the sodium-based dechlorinating agents A and B added with the above-mentioned anti-caking agents. Analysis was carried out through measurement by the method mentioned above by the use of a powder tester PT-D made by Hosokawa Micron Corporation. For the sodium-based dechlorinating agent A in this example, measured values of angle of repose of 53° and dispersibility of 21% were obtained, and from Tables 5 and 6, indices of 12 for the angle of repose and 16 for the dispersibility were read. Similarly, measurement of the other items gave a floodability index value of 74, suggesting a high degree of floodability. A similar evaluation was made also for the sodium-based dechlorinating agent B, showing a floodability index value of 90, suggesting a very high floodability. The results are shown in Table 2.

TABLE 2

|  | SODIUM-BASED DECHLORINATING AGENT A | | SODIUM-BASED DECHLORINATING AGENT B | |
|---|---|---|---|---|
|  | MEASURED VALUE | INDEX | MEASURED VALUE | INDEX |
| ANGLE OF REPOSE (°) | 53 | 12 | 38 | 18 |
| DISPERSIBILITY (%) | 21 | 16 | 57 | 25 |
| FLOODABILITY INDEX | — | 74 | — | 90 |

Comparison of the sodium-based dechlorinating agent A and the sodium-based dechlorinating agent B gives the following findings. As to powder properties, while the sodium-based dechlorinating agent A showed a normal flowability similar to that of calcium hydroxide, and easily mixed with water, the sodium-based dechlorinating agent B showed a very high flowability, and repelled water, not being adapted to it.

To see practical applicability, experiments were carried out in an actual plant on operability of the bag filter. The result is shown in Table 3. The filter cloth comprised Teflon-laminated double-woven glass cloth for both the sodium-based dechlorinating agents A and B. Because peeling of the Teflon laminate was observed on a part of the filter cloth, the amount of leakage of an agent is larger for the sodium-based dechlorinating agent B.

TABLE 3

|  | SODIUM-BASED DECHLORINATING AGENT A | SODIUM-BASED DECHLORINATING AGENT B |
|---|---|---|
| KIND OF FILTER CLOTH | TEFLON LAMINATE | TEFLON LAMINATE |
| PRESSURE DROP OF | ≦4.9 × $10^2$ Pa | ≧2 × $10^3$ Pa or more |

TABLE 3-continued

|  | SODIUM-BASED DECHLORINATING AGENT A | SODIUM-BASED DECHLORINATING AGENT B |
|---|---|---|
| FILTER CLOTH LEAKAGE OF AGENT | ≦1 mg/$Nm^3$ or less | ≦120 mg/$Nm^3$ or less |

For the sodium-based dechlorinating agent A, the pressure drop of filter cloth was low as up to 4.9×$10^2$ Pa, with a leakage from the filter cloth of up to 1 mg/$Nm^3$, thus posing no practical problem. For the sodium-based dechlorinating agent B, in contrast, pressure drop of filter cloth is high as 2×$10^3$ Pa, with also a high leakage of 120 mg/$Nm^3$, thus showing difficulty in practical application.

Experiments of leakage concentration and pressure drop were carried out for the use of a double-woven glass cloth alone as the filter cloth, and the use of a double-woven glass cloth having a Teflon laminate formed on the surface thereof. The result is shown in Table 4.

TABLE 4

|  | SODIUM-BASED DECHLORINATING AGENT A | SODIUM-BASED DECHLORINATING AGENT B |
|---|---|---|
| DOUBLE-WOVEN GLASS CLOTH |  |  |
| LEAKAGE CONCENTRATION (mg/$Nm^3$) | 0 | 15000 |
| PRESSURE DROP (Pa) | 4 × $10^2$ | 8.5 × $10^2$ |
| DOUBLE-WOVEN GLASS CLOTH + TEFLON LAMINATE |  |  |
| LEAKAGE CONCENTRATION (mg/$Nm^3$) | 0 | 0 |
| PRESSURE DROP (Pa) | 1.8 × $10^2$ | 7.5 × $10^2$ |

In the case with a double-woven glass cloth alone, both the leakage concentration and the pressure drop are large for the sodium-based dechlorinating agent B, whereas, for the sodium-based dechlorinating agent A, both the leakage concentration and the pressure drop are small. In the case with a double-woven glass cloth having a Teflon laminate formed on the surface thereof, while the leakage concentration is null for both the sodium-based dechlorinating agents A and B, the pressure drop is very large for the sodium-based dechlorinating agent B.

TABLE 5

LIST OF FLOWABILITY INDICES OF POWDER

| FLOWABILITY | FLOWABILITY INDEX | MEASURES TO PREVENT BRIDGE FORMATION | ANGLE OF REPOSE (°) | INDEX | COMPRESSIBILITY (°) | INDEX | ANGLE OF SPATULA (°) | INDEX | UNIFORMITY (—) | INDEX |
|---|---|---|---|---|---|---|---|---|---|---|
| EXCELLENT (A) | 90–100 | NOT NECESSARY | <25 | 25 | <5 | 25 | 1 | 25 | 1 | 25 |
|  |  |  | 26–29 | 24 | 6–9 | 23 | 2–4 | 24 | 2–4 | 23 |
|  |  |  | 30 | 22.5 | 10 | 22.5 | 5 | 22.5 | 5 | 22.5 |
| VERY GOOD (B) | 80–90 | NOT NECESSARY | 31 | 22 | 11 | 22 | 32 | 22 | 6 | 22 |
|  |  |  | 32–34 | 21 | 12–14 | 21 | 33–37 | 21 | 7 | 21 |
|  |  |  | 35 | 20 | 15 | 20 | 38 | 20 | 8 | 20 |
| GOOD (C) | 70–80 | VIBRATOR MAYBE NECESSARY | 36 | 19.5 | 16 | 19.5 | 39 | 19.5 | 9 | 19 |
|  |  |  | 37–39 | 18 | 17–19 | 18 | 40–44 | 18 | 10–11 | 18 |
|  |  |  | 40 | 17.5 | 20 | 17.5 | 45 | 17.5 | 12 | 17.5 |
| ORDINARY (D) | 60–69 | LIMIT POINT, BRIDGE FORMATION | 41 | 17 | 21 | 17 | 46 | 17 | 13 | 17 |
|  |  |  | 42–44 | 16 | 22–24 | 16 | 47–59 | 16 | 14–16 | 16 |
|  |  |  | 45 | 15 | 25 | 15 | 60 | 15 | 17 | 15 |
| FAIR (E) | 40–59 | NECESSARY | 46 | 14.5 | 26 | 14.5 | 61 | 14.5 | 18 | 14.5 |
|  |  |  | 47–54 | 12 | 27–30 | 12 | 62–74 | 12 | 19–21 | 12 |
|  |  |  | 55 | 10 | 31 | 10 | 75 | 10 | 22 | 10 |
| POOR (F) | 20–39 | REQUIRED POWERFUL MEASURES | 56 | 9.5 | 32 | 9.5 | 76 | 9.5 | 23 | 9.5 |
|  |  |  | 57–64 | 7 | 33–36 | 7 | 77–89 | 7 | 24–26 | 7 |
|  |  |  | 65 | 5 | 37 | 5 | 90 | 5 | 27 | 5 |
| VERY POOR (G) | 0–19 | REQUIRED SPECIAL DEVICE AND METHOD | 66 | 4.5 | 38 | 4.5 | 91 | 4.5 | 28 | 4.5 |
|  |  |  | 67–89 | 2 | 39–45 | 2 | 92–99 | 2 | 29–35 | 2 |
|  |  |  | 90 | 0 | <45 | 0 | <99 | 0 | >35 | 0 |

TABLE 6

LIST OF FLOODABILITY INDICES OF POWDER

| FLOODABILITY | FLOODABILITY INDEX | PREVENTIVE MEASURES | FLUIDITY (INDEX DERIVED OF ABOVE TABLE) | INDEX | ANGLE OF FALL (°) | INDEX | ANGLE OF DIFFERENCE (°) | INDEX | DISPERSIBILITY (%) | INDEX |
|---|---|---|---|---|---|---|---|---|---|---|
| VERY HIGH (A) | 80–100 | REQUIRED ROTARY SEAL | >60 | 25 | 10 | 25 | >30 | 25 | >50 | 25 |
|  |  |  | 59–56 | 24 | 11–19 | 24 | 29–28 | 24 | 49–44 | 23 |
|  |  |  | 55 | 22.5 | 20 | 22.5 | 27 | 22.5 | 43 | 22.5 |
|  |  |  | 54 | 22 | 21 | 22 | 26 | 22 | 42 | 22 |
|  |  |  | 53–50 | 21 | 22–24 | 21 | 25 | 21 | 41–36 | 21 |
|  |  |  | 49 | 20 | 25 | 20 | 24 | 20 | 35 | 20 |
| HIGH (B) | 60–79 | REQUIRED ROTARY SEAL | 48 | 19.5 | 26 | 19.5 | 23 | 19.5 | 34 | 19.5 |
|  |  |  | 47–45 | 18 | 27–29 | 18 | 22–20 | 18 | 33–29 | 18 |
|  |  |  | 44 | 17.5 | 30 | 17.5 | 19 | 17.5 | 28 | 17.5 |
|  |  |  | 43 | 17 | 31 | 17 | 18 | 17 | 27 | 17 |
|  |  |  | 42–40 | 16 | 32–39 | 16 | 17–16 | 16 | 26–21 | 16 |
|  |  |  | 39 | 15 | 40 | 15 | 15 | 15 | 20 | 15 |

According to the present invention, as described above, particles resulting from calcination of sodium hydrogencarbonate and having reacted with hydrogen chloride or particles of the anti-caking agent never entrap into the filter cloth attached to the dust collector, thus permitting avoidance of clogging of the filter cloth by particles resulting from calcination of sodium hydrogencarbonate and having reacted with hydrogen chloride or particles of the anti-caking agent. It is therefore possible to prevent occurrence of a pressure drop in the filter cloth.

Since particle resulting from calcination of sodium hydrogencarbonate and having reacted with hydrogen chloride or particles of the anti-caking agent never entrap into the filter cloth, particles resulting from calcination of sodium hydrogencarbonate and having reacted with hydrogen chloride or particles of the anti-caking agent never pass through the filter cloth and flow in the downstream, thus permitting prevention of leakage of the dechlorinating agent.

What is claimed is:

1. A waste treatment equipment comprising:
   a pyrolytic reactor which causes pyrolysis of waste to generate pyrolytic gases and pyrolytic residue mainly comprising non-volatile constituents; separating means for separating said pyrolytic residue into combustible constituents and incombustible constituents;
   a combustion melting furnace to which said pyrolytic gases and said combustible constituents are fed, and which causes combustion thereof and discharges molten slag and flue gases;
   first flue gas treating means for removing dust from said flue gases;
   second flue gas treating means dechlorinating the flue gases from said first flue gas treating means by adding a dechlorinating agent;
   a separator which separates water-insoluble constituents not dissolved in water from an aqueous solution containing a residue of dechlorination dissolved therein by adding water to a residue of dechlorination generated by said second flue gas treating means;

a pH modifier which adjusts pH of a remaining aqueous solution after separation of the water-insoluble constituents by said separator;

at least one dioxin removing unit which removes dioxin and the like from the residue of dechlorination generated by said second flue gas treating means and/or from the aqueous solution of which pH has been adjusted by said pH modifier; and wherein a sodium-based dechlorinating agent comprising a mixture of sodium hydrogencarbonate and a hydrophilic anti-caking agent, and having an angle of repose of 40° or more, a dispersibility of less than 50 and a floodability index value of less than 90, serving as said dechlorinating agent, is added to said second flue gas treating means.

2. A waste treatment equipment according to claim 1, wherein said sodium hydrogencarbonate has a mean particle diameter within a range of from 2 μm to 30 μm.

3. A waste treatment equipment according to claim 1, wherein said hydrophilic anti-caking agent comprises silica, and 0.1 mass % or more of said hydrophilic anti-caking agent is mixed into said sodium-based dechlorinating agent.

4. A waste treatment equipment according to claim 1, wherein said sodium hydrogencarbonate has a mean particle diameter within a range of from 2 μm to 30 μm, said hydrophilic anti-caking agent is a silica-based anti-caking agent, and 0.1 mass % or more of said hydrophilic anti-caking agent is mixed into said sodium-based dechlorinating agent.

5. A waste treatment equipment according to claim 1, wherein said hydrophilic anti-caking agent has a mean particle diameter within a range of from 0.001 μm to 1 μm.

6. A waste treatment equipment according to claim 5, wherein, in said grinder, said sodium hydrogencarbonate is ground into a mean particle diameter within a range of from 2 μm to 30 μm.

7. A waste treatment equipment according to claim 1, further including a mercury removing unit which removes mercury from the remaining aqueous solution after separation of the water-insoluble constituents.

8. A waste treatment equipment according to claim 1, further including a mixer for mixing said sodium hydrogencarbonate and said hydrophilic anti-caking agent and a grinder for grinding said sodium hydrogencarbonate.

9. A waste treatment equipment according to claim 1, wherein a mercury removing unit for removing mercury from the aqueous solution of which pH has been adjusted by said pH modifier is provided downstream of said pH modifier.

* * * * *

UNITED STATES PATENT AND TRADEMARK OFFICE
CERTIFICATE OF CORRECTION

PATENT NO.    : 6,949,226 B2
DATED         : September 27, 2005
INVENTOR(S)   : Sugimoto et al.

It is certified that error appears in the above-identified patent and that said Letters Patent is hereby corrected as shown below:

<u>Title page,</u>
Item [75], Inventors, delete the name "Sigeru Sakurai, Fukuoka (JP);" and insert
-- Shigeru Sakurai, Fukuoka (JP); --.

Signed and Sealed this

Sixth Day of December, 2005

JON W. DUDAS
*Director of the United States Patent and Trademark Office*